(12) United States Patent
Endtner et al.

(10) Patent No.: US 8,362,119 B2
(45) Date of Patent: Jan. 29, 2013

(54) HALOGEN FREE FLAME-RETARDANT THERMOPLASTIC MOULDING COMPOSITIONS BASED ON POLYAMIDE WITH INCREASED GLOW-WIRE RESISTANCE

(75) Inventors: Jochen Endtner, Köln (DE); Detlev Joachimi, Krefeld (DE); Richard Weider, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 476 days.

(21) Appl. No.: 11/662,457

(22) PCT Filed: Aug. 31, 2005

(86) PCT No.: PCT/EP2005/009362
§ 371 (c)(1),
(2), (4) Date: Oct. 22, 2007

(87) PCT Pub. No.: WO2006/029711
PCT Pub. Date: Mar. 26, 2006

(65) Prior Publication Data
US 2008/0161490 A1 Jul. 3, 2008

(30) Foreign Application Priority Data

Sep. 13, 2004 (DE) ............... 10 2004 044 131
Oct. 7, 2004 (DE) ............... 10 2004 048 876

(51) Int. Cl.
*C08G 18/77* (2006.01)
(52) U.S. Cl. .................... 524/115; 524/606
(58) Field of Classification Search ............ 524/101
See application file for complete search history.

(56) References Cited

U.S. PATENT DOCUMENTS

| 3,900,444 | A | 8/1975 | Rackey et al. ........ 260/45.75 P |
| 4,036,811 | A | 7/1977 | Noetzel et al. ....... 260/45.75 W |
| 5,015,681 | A * | 5/1991 | Steiert et al. .............. 524/101 |
| 5,412,017 | A * | 5/1995 | Gareiss et al. ............. 524/436 |
| 5,669,095 | A | 9/1997 | Dausch et al. ................ 8/158 |
| 5,780,534 | A | 7/1998 | Kleiner et al. .............. 524/133 |
| 6,121,445 | A | 9/2000 | Suzuki et al. ............... 544/195 |
| 6,207,736 | B1 | 3/2001 | Nass et al. .................. 524/126 |
| 6,365,071 | B1 | 4/2002 | Jenewein et al. ............ 252/609 |
| 6,509,401 | B1 | 1/2003 | Jenewein et al. ............ 524/116 |
| 6,538,054 | B1 * | 3/2003 | Klatt et al. .................. 524/101 |
| 6,547,992 | B1 | 4/2003 | Schlosser et al. |
| 2002/0002228 | A1 | 1/2002 | Takeda et al. ............... 524/405 |
| 2002/0096669 | A1 | 7/2002 | Van Der Spek et al. .... 252/601 |
| 2003/0030042 | A1 * | 2/2003 | Sawada et al. ............. 252/604 |
| 2004/0021135 | A1 | 2/2004 | Steenbakkers-Menting . 252/609 |
| 2004/0049063 | A1 * | 3/2004 | Hoerold et al. ............... 556/17 |
| 2004/0227130 | A1 * | 11/2004 | Hoerold et al. ............. 252/601 |
| 2005/0014874 | A1 * | 1/2005 | Hoerold et al. ............. 524/126 |
| 2005/0032958 | A1 | 2/2005 | Bauer et al. |
| 2005/0101706 | A1 | 5/2005 | Bauer et al. |
| 2005/0234161 | A1 * | 10/2005 | Steib et al. ................. 524/115 |
| 2006/0089435 | A1 | 4/2006 | Hoerold et al. ............. 524/115 |
| 2006/0111483 | A1 | 5/2006 | Mitchell et al. ............. 524/115 |
| 2007/0299171 | A1 | 12/2007 | Couillens et al. ............ 524/133 |

FOREIGN PATENT DOCUMENTS

| DE | 42 36 122 | 4/1994 |
| EP | 0 024 167 | 2/1981 |
| EP | 1607400 A2 | 12/2005 |
| JP | 2003-226819 | 8/2003 |
| JP | 2003-342482 | 12/2003 |

OTHER PUBLICATIONS

Gmelin Syst.-No. 32, Zn, 1924, p. 248, supplementary volume, 1956, pp. 971-972, Kirk Othmer (4th) 407-408, 20, 942.
Ullmann's Encyclopedia of Industrial Chemistry, Fifth Completely Revised Edition, vol. A 4, pp. 276-280 "Boric Oxide, Boric Acid, and Borates".
Winnacker-Kuchler (4th) 2, 556.
Co-pending U.S. Appl. No. 12/083,185.
Office Action for corresponding Japanese co-pending application No. 2007-530623, mailed Feb. 16, 2010, with English-language translation, 6 pages.
Gachter, Muller, Kunststoff-Additive [Plastics Additives], 3rd edition, Hanser-Verlag, Munich, Vienna 1989.
Plastics Additives Handbook, 5th edition, Hanser-Verlag, Munich, 2001.Various pages & sections.

* cited by examiner

*Primary Examiner* — Doris Lee
(74) *Attorney, Agent, or Firm* — Nicanor A. Kohncke

(57) ABSTRACT

The present invention relates to thermoplastic moulding compositions comprising unbranched, thermoplastic polyamide, a phosphinic or diphosphinic salt, a nitrogen-containing flame retardant combination and also at least one oxygen-containing, nitrogen-containing or sulphur-containing metal compound and also to the production and the use of the inventive moulding compositions for production of fibres, of foils and of mouldings of any type.

7 Claims, No Drawings

HALOGEN FREE FLAME-RETARDANT THERMOPLASTIC MOULDING COMPOSITIONS BASED ON POLYAMIDE WITH INCREASED GLOW-WIRE RESISTANCE

The present invention relates to thermoplastic moulding compositions comprising unbranched, thermoplastic polyamide, a phosphinic or diphosphinic salt, a nitrogen-containing flame retardant combination and also at least one oxygen-containing, nitrogen-containing or sulphur-containing metal compound and also to the production and the use of the inventive moulding compositions for production of fibres, of foils and of mouldings of any type.

The chemical constitution of many plastics makes them readily combustible. Flame retardants therefore generally have to be added to plastics so that the high flame-retardancy requirements set by plastics processors and sometimes by legislation can be achieved. To this end, there is a wide variety of known flame retardants and flame retardant synergists, and these are also commercially available. Non-halogenated flame retardant systems have been used with preference for some time because of more advantageous fire-related properties in relation to smoke density and smoke constitution.

Among the non-halogenated flame retardants, salts of phosphinic acids (phosphinates) have proven particularly effective in particular for thermoplastic polymers (DE-A-2 252 258 (=U.S. Pat. No. 3,900,444) and DE-A-2 447 727 (=U.S. Pat. No. 4,036,811)). Some derivatives of this class of flame retardant are of particular interest because they have very little adverse effect on the mechanical properties of the thermoplastic moulding compositions.

Synergistic combinations of phosphinates with certain nitrogen-containing compounds, in particular with melamine derivatives, have moreover been found and are more effective than the phosphinates alone as flame retardants in very many polymers (WO-A 2002/28953 (=US 2004021135A1, WO-A 97/01664 (=U.S. Pat. No. 5,669,095) and also DE-A-197 34 437 (=U.S. Pat. No. 6,207,736) and DE-A-197 37 727 (=U.S. Pat. No. 6,509,401)).

It has also been found that the flame-retardant action of the various phosphinates in thermoplastic polymers can be markedly improved via additions of small amounts of inorganic or mineral compounds which do not contain nitrogen, and that the additives mentioned also can improve the flame-retardant action of phosphinates in combination with nitrogen-containing synergists (EP-A 024 167 (=GB 8024901A), WO-A 2004/016684)).

When phosphinate-containing flame retardant systems are used, the result particularly at processing temperatures above 300° C. was initially partial polymer degradation, discolouration of the polymer and evolution of fume during processing. These difficulties could, however, be suppressed via addition of basic or amphoteric oxides, hydroxides, carbonates, silicates, borates or stannates (WO-A 2004/022640).

A particular continuing problem, however, is the behaviour of the thermoplastic moulding compositions equipped with phosphinate-containing flame retardant systems with regard to their IEC 60695-2 glow-wire resistance, in particular the IEC 60695-2-13 glow-wire ignition test ("GWIT"), in which the moulding composition in the form of a sheet is not permitted to ignite during contact with a glowing wire, "ignition" here having been defined as appearance of a flame for $\geq 5$ s. This GWIT test is also a significant constituent of IEC 60335-1, which applies to certain components which are present in unattended household appliances and which carry electrical current or are subject to electrical potential, and demands materials whose GWIT classification is at least 775° C. Within IEC 60335-1, a particularly demanding feature which is optional but demanded by many users is the glow-wire ignition test on the finished part, in which a flame can appear for at most 2s during contact of the component with a hot glow wire whose temperature is 750° C. However, because these finished parts have a wide variety of shapes and of designs, a high probability of success in the IEC 60335-1 finished part test is only likely if the underlying thermoplastic moulding composition also reproducibly gives no ignition with development of flame for >2s during the GWIT test on the sheet (IEC 60695-2-13) at glow-wire temperatures of at least 750° C. and at various wall thicknesses.

It was therefore an object of the present invention to provide halogen-free, flame-retardant, thermoplastic polyamide moulding compositions based on phosphinate-containing flame retardant systems, where these also reproducibly give no ignition [no development of flame for >2s] in the IEC 60695-2-13 GWIT test with glow-wire temperature of at least 750° C. at various wall thicknesses.

Another object of the invention was that the balanced property profile known from the phosphinate-containing flame-retardant polyamide moulding compositions with regard to thermal and electrical properties, and also with regard to flame retardancy (UL94 V-0 starting at 0.8 mm) and mechanical properties (ISO 180 1/U IZOD impact resistance >45 kJ/m$^2$ and strength greater than 200 MPa) is also very substantially retained alongside improved glow-wire resistance.

Surprisingly, it has now been found that the EEC 60695-2-13 glow-wire resistance (GWIT) can be markedly improved in phosphinate-containing flame-retardant thermoplastic polyamides if the moulding composition comprises, in addition to the phosphinates, a specific combination composed of at least two different nitrogen-containing flame retardants and also of at least one oxygen-, nitrogen- or sulphur-containing metal compound of the second main or transition group. With this specific combination, the balanced property profile with regard to electrical, thermal and mechanical properties is very substantially retained.

The invention therefore provides a thermoplastic moulding composition, comprising
A) from 20 to 97% by weight of an unbranched thermoplastic polyamide,
B) from 1 to 30% by weight, preferably from 1 to 20% by weight, particularly preferably from 5 to 15% by weight, based on the entire composition, of one or more phosphinic salts of the formula (I) and/or of one or more diphosphinic salts of the formula (II) and/or polymers of these,

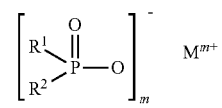

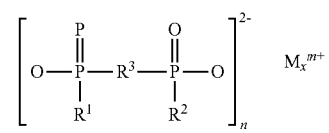

in which
R$^1$ and R$^2$ are identical or different and are hydrogen and/or linear or branched C$_1$-C$_6$-alkyl and/or are aryl, $R^3$ is linear or branched $C_1$-$C_{10}$-alkylene or $C_6$-$C_{10}$-arylene or is $C_1$-$C_6$-alkylarylene or aryl-$C_1$-$C_6$-alkylene, M is alkaline earth metals, alkali metals, aluminium, zinc, titanium, zirconium, silicon, tin and/or a protonated nitrogen base, m is from 1 to 4, n is from 1 to 3, x is 1 and 2, C) from 1 to 40% by weight of a nitrogen-containing flame retardant combination composed of C1) from 0.1 to 25% by weight, preferably from 0.2 to 10%, particularly preferably from 0.5 to 5%, based on 100% by weight of the entire composition, of melamine cyanurate and C2) at least 0.1 to 25% by weight, preferably from 1 to 15% by weight, particularly preferably from 2 to 10% by weight, based on 100% by weight of the entire composition, of another nitrogen-containing flame retardant which is not melamine cyanurate, preferably reaction products of melamine with phosphoric acid or with condensed phosphoric acids or, respectively, reaction products of condensates of melamine with phosphoric acid or with condensed phosphoric acids, particularly preferably melamine phosphate, melam polyphosphate, melon polyphosphate and melem polyphosphate, very particularly preferably melamine polyphosphate, and D) 0.1 to 10% by weight, preferably from 0.5 to 5% by weight, particularly preferably from 0.75 to 3.5% by weight, at least one oxygen-, nitrogen- or sulphur-containing metal compound, preferably of the second main or transition group, particularly preferably Ca, Mg and Zn, very particularly preferably zinc borate and zinc sulphide.

In one preferred embodiment, the thermoplastic moulding compositions can comprise not only components A) to D) but also E) from 0.01 to 5% by weight, preferably from 0.05 to 3% by weight, particularly preferably from 0.1 to 2% by weight, of at least one lubricant and/or mould-release agent.

In one preferred embodiment, the thermoplastic moulding compositions can comprise not only components A) to E) but also, or instead of E), component F) from 0.1 to 60% by weight, preferably from 1 to 50% by weight, particularly preferably from 10 to 40% by weight, of one or more fillers and reinforcing materials.

In another preferred embodiment, the thermoplastic moulding compositions can comprise not only components A) to F) but also, or instead of components E) and/or F), G) from 0.01 to 40% by weight, preferably from 0.01 to 20% by weight, particularly preferably from 0.1 to 15% by weight, in each case based on the entire composition, of other additives.

The total of the proportions of the components in each case gives a total of 100% by weight.

Surprisingly, the thermoplastic moulding compositions comprising components A), B), C1), C2) and D) give the glow-wire resistance required by IEC 60695-2-13 and reproducibly give no ignition [no development of flame for >2s], and at the same time retain the balanced property profile known from phosphinate-containing flame-retardant polyamide moulding compositions.

According to Hans Domininghaus in "Die Kunststoffe und ihre Eigenschaften" [Plastics and their Properties], 5th edition (1998), p. 14, are polymers which soften when heated and can be moulded almost in any desired manner, and whose molecular chains have either no side branches or else have varying numbers of relatively short or relatively long side branches.

According to the invention, the compositions comprise, as component A), at least one unbranched thermoplastic polyamide. The inventive polyamides can be prepared by various processes and can be synthesized from a very wide variety of units, and in specific applications can be equipped with processing aids, stabilizers, polymeric alloy partners (e.g. elastomers) or else reinforcing materials (e.g. mineral fillers or glass fibres), alone or in combination, to give materials with specifically adjusted combinations of properties. Blends with proportions of other polymers, e.g. of polyethylene, polypropylene, ABS (acrylonitrile-butadiene-styrene copolymers) are also suitable, and it is possible here, if appropriate, to use one or more compatibilisers. The properties of the polyamides can be improved via addition of elastomers, e.g. in relation to the impact resistance of, for example, reinforced polyamides. The wide variety of possible combinations can give very many products with a very wide variety of properties.

Very many procedures have been disclosed for preparation of polyamides, using, as a function of the desired final product, different monomer units and, respectively, various chain regulators to set a desired molecular weight, or else monomers having reactive groups for post-treatment intended subsequently.

The industrially relevant processes for preparation of polyamides mostly proceed by way of polycondensation in the melt. In this context the hydrolytic polymerization of lactams is also regarded as polycondensation.

Preferred polyamides are semicrystalline polyamides which can be prepared starting from diamines and dicarboxylic acids and/or lactams having at least 5 ring members or corresponding amino acids.

Starting materials that can be used are aliphatic and/or aromatic dicarboxylic acids, such as-adipic acid, 2,2,4- and 2,4,4-trimethyladipic acid, azelaic acid, sebacic acid, isophthalic acid, terephthalic acid, aliphatic and/or aromatic diamines, e.g. tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, e.g. aminocaproic acid and, respectively, the corresponding lactams. Copolyamides composed of a plurality of the monomers mentioned are included.

Caprolactams are particularly preferably used, and ε-caprolactam is very particularly preferably used.

Other particularly suitable materials are most of the compounded materials based on PA6, on PA66 and on other aliphatic and/or aromatic polyamides and, respectively, copolyamides, where these have from 3 to 11 methylene groups for each polyamide group in the polymer chain.

The polyamides prepared according to the invention can also be used in a mixture with other polyamides and/or with other polymers.

The polyamides can comprise conventional additives, e.g. mould-release agents, stabilisers and/or flow aids, admixed while the material is still in the melt or applied to the surface.

The inventive compositions comprise, as component B), one or more phosphinic salts of the formula (I) and/or one or more diphosphinic salts of the formula (II) and/or polymers of these, in which $R^1$ and $R^2$ are identical or different and are hydrogen and/or linear or branched $C_1$-$C_6$-alkyl and/or are aryl, $R^3$ is linear or branched $C_1$-$C_{10}$-alkylene, $C_6$-$C_{10}$-arylene and/or is $C_1$-$C_6$-alkylarylene or aryl-$C_1$-$C_6$-alkylene, M is alkaline earth metals, alkali metals, aluminium, zinc, titanium, zirconium, silicon, tin and/or a protonated nitrogen base, m is from 1 to 4,
n is from 1 to 3, and
x is 1 and 2.

M is preferably magnesium, calcium, aluminium and/or zinc. Protonated nitrogen bases are preferably the protonated bases of ammonia, 1,3,5-triazine compounds and triethanolamine, particularly preferably melamine. $R^1$ and $R^2$, identical or different, are preferably $C_1$-$C_6$-alkyl, linear or branched and/or phenyl. $R^1$ and $R^2$, identical or different, are particularly preferably methyl, ethyl, n-propyl, isopropyl, n-butyl, tert-butyl, n-pentyl and/or phenyl. $R^3$ is preferably methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene. $R^3$ is particularly preferably phenylene or naphthylene. WO-A 97/39053 (=U.S. Pat. No. 6,365,071) describes suitable phosphinates, and its content in relation to the phosphinates of the present application is incorporated herein by way of reference. For the purposes of the present invention, particularly preferred phosphinates are aluminium, calcium and zinc dimethylphosphinate, ethylmethylphosphinate, diethylphosphinate and methyl-n-propylphosphinate and mixtures of these.

m is preferably 2 and 3, particularly preferably 3.
n is preferably 1 and 3, particularly preferably 3.
x is preferably 1 and 2, particularly preferably 2.

The term phosphinic salt used hereinafter means, for the purposes of the present invention, not only salts of phosphinic acids but also salts of diphosphinic acids and polymers of these.

These phosphinic acids, which are prepared in an aqueous medium, are in essence monomeric compounds. As a function of the reaction conditions, polymeric phosphinic salts can also sometimes be produced.

Examples of suitable phosphinic acids as constituent of the phosphinic salts are dimethylphosphinic acid, ethylmethylphosphinic acid, diethylphosphinic acid, methyl-n-propylphosphinic acid or diphenylphosphinic acid.

The salts of the phosphinic acids according to the present invention can be prepared by known processes, for example those described in EP-A 0 699 708 (=U.S. Pat. No. 5,780,534), the content of which is incorporated by way of reference into the present application. The phosphinic acids are reacted here in aqueous solution with metal carbonates, metal hydroxides or metal oxides.

The inventive compositions comprise, as component C), a specific combination composed of at least two different nitrogen-containing flame retardants, of which component C1) is melamine cyanurate, the proportion present of which is from 0.1 to 25% by weight, preferably from 0.2 to 10% by weight, particularly preferably from 0.5 to 5% by weight, based on all of the components of the moulding composition. Melamine cyanurate is the reaction product from preferably equimolar amounts of melamine and cyanuric acid or isocyanuric acid. Among these products are, inter alia, all of the commercially available product grades. Examples of these are, inter alia, Melapur® MC 25 (CIBA Melapur, Basle, Switzerland) and also Budit® 315 (Budenheim, Budenheim, Germany) or Plastisan® B or Plastisan® S (3V, Bergamo, Italy). The melamine cyanurate used is composed of particles whose average particle diameters are from 0.1 µm to 100 µm, preferably from 0.1 µm to 30 µm, particularly preferably from 0.1 µm to 7 µm and can have been surface-treated or have been coated with known means. Among these are, inter alia, organic compounds which can have been applied in monomeric, oligomeric and/or polymeric form to the melamine cyanurate. By way of example, it is possible to use coating systems based on silicon-containing compounds, for example on organofunctionalized silanes or on organosiloxanes. Coatings with inorganic components are also possible. Melamine cyanurate is usually obtained from the starting materials in an aqueous medium at temperatures of from 90 to 100° C.

Component C) comprises not only melamine cyanurate C1) but also at least one other nitrogen-containing component C2) which is not melamine-cyanurate and which is active as flame retardant or as flame retardant synergist. Compounds suitable for this purpose are melamine, melamine borate, melamine oxalate, melamine phosphate (prim.), melamine phosphate (sec.) and melamine pyrophosphate (sec.), polymeric melamine phosphate and also amine neopentyl glycol borate. Guanidine salts are likewise suitable, examples being guanidine carbonate, guanidine cyanurate (prim.), guanidine phosphate (prim.), guanidine phosphate (sec.), guanidine sulphate (prim.), guanidine sulphate (sec.), guanidine pentaerythrityl borate, guanidine neopentyl glycol borate, urea phosphate and also urea cyanurate. It is also possible to use ammeline, ammelide and also condensates of melamine, e.g. melem, melam, melon or compounds of this type with higher level of condensation. Likewise suitable compounds are ammonium polyphosphate and tris(hydroxyethyl) isocyanurate or its reaction products with carboxylic acids; benzoguanamine and its adducts and, respectively, salts are likewise suitable as also are its products having substitution on the nitrogen atom and also their salts and adducts. Other nitrogen-containing components that can be used are allantoin compounds and also their salts with phosphoric acid, boric acid or pyrophosphoric acid and also glycolurils or their salts. It is also possible to use inorganic nitrogen-containing compounds, e.g. ammonium salts.

Component C2) is preferably reaction products of melamine with phosphoric acid or with condensed phosphoric acids, or is reaction products of condensates of melamine with phosphoric acid or with condensed phosphoric acids, or else is a mixture of the products mentioned. Reaction products with phosphoric acids are products obtained via reaction of melamine or of the condensed melamine compounds melam, melem or melon etc., with phosphoric acid. Examples of these are dimelamine phosphate, dimelamine pyrophosphate, melamine phosphate, melamine pyrophosphate, melamine polyphosphate, melam polyphosphate, melon polyphosphate and melem polyphosphate and the mixed polysalts described by way of example in WO-A 98/39306 (=U.S. Pat. No. 6,121,445). Component C2) is particularly preferably melamine polyphosphate. Various product grades of melamine polyphosphate are commercially available. Examples of these are, inter alia, Melapur® 200/70 (CIBA Melapur, Basle, Switzerland) and also Budit® 3141 (Budenheim, Budenheim, Germany).

According to the invention, the compositions comprise, as component D), from 0.1 to 10% by weight, preferably from 0.5 to 5% by weight, particularly preferably from 0.75 to 3.5% by weight, of at least one oxygen-, nitrogen- or sulphur-containing metal compound. Compounds suitable for this purpose are ZnO, in particular activated ZnO (e.g. Bayer AG, Leverkusen, Germany), ZnS, $TiO_2$, $MgCO_3$, $CaCO_3$, zinc borate, CaO, MgO, $Mg(OH)_2$, TiN, boron nitride, $Mg_3N_2$, $Zn_3N_2$, $Zn_3(PO_4)_2$, $Ca_3(PO_4)_2$, calcium borate, magnesium borate or a mixture of these. Metals preferred according to the invention are Ca, Mg and Zn, and particular preference is given to zinc borate and zinc sulphide. Zinc sulphide is generally used in the form of particulate solid. Examples of commercially available products are Sachtolith® HDS or Sachtolith(® HD (both from Sachtleben, Duisburg, Germany). For the purposes of the present invention, the term zinc borate means substances obtainable from zinc oxide and boric acid. There are various known hydrates of the zinc borates, examples being $ZnO.B_2O_3.2H_2O$ and $2\ ZnO.3\ B_2O_3.3.5\ H_2O$, and preference is given here to compounds of the two abovementioned compositions. Examples of zinc borates that can be used are described in Gmelin Syst.-No. 32, Zn, 1924, p. 248, supplementary volume, 1956, pp. 971-972, Kirk-Othmer (4th) 4, 407-408, 10, 942; Ullmann (5th) A 4, 276; Winnacker-Küchler (4th) 2, 556. Commercially available grades of zinc borate are, inter alia, the products ZB-223, ZB-467 and ZB-Lite from Anzon Ltd. (London, England) or Firebrake® ZB from Deutsche Borax GmbH (Sulzbach, Germany).

Components D) can likewise be used in the form of compacted material or else in the form of masterbatches in a polymeric carrier material. Components D) can moreover have been surface-treated and, respectively, coated with known means. Among these are, inter alia, organic compounds, which may have been applied in monomeric, oligomeric and/or polymeric form. Coatings with inorganic components are likewise possible.

In one preferred embodiment, the compositions can, if appropriate, also comprise lubricants and/or mould-release agents as component E). Examples of compounds suitable for this purpose are long-chain fatty acids (e.g. stearic acid or behenic acid), their salts (e.g. Ca stearate or Zn stearate) or else their ester derivatives or amide derivatives (e.g. ethylenebisstearylamide), montan waxes (mixtures composed of straight-chain, saturated carboxylic acids having chain lengths of from 28 to 32 carbon atoms) or else low-molecular-weight polyethylene waxes or low-molecular-weight polypropylene waxes. According to the invention, it is preferable to use lubricants and/or mould-release agents from the group of the esters or amides of saturated or unsaturated aliphatic carboxylic acids having from 8 to 40 carbon atoms with saturated aliphatic alcohols or amines having from 2 to 40 carbon atoms, very particular preference being given here to ethylenebisstearylamide or pentaerythrityl tetrastearate (PETS).

In another preferred embodiment, the compositions can, if appropriate, comprise, in addition to E) or as an alternative to E), one or more fillers and reinforcing materials as component F). Examples of fibrous or particulate fillers and reinforcing materials that can be added to the inventive moulding compositions are glass fibres, glass beads, glass textiles, glass mats, carbon fibres, heat-resistant organic fibres (e.g. aramid or polyphthalimide fibres), potassium titanate fibres, natural fibres, amorphous silica, magnesium carbonate, barium sulphate, feldspar, mica, silicates, quartz, kaolin, calcined kaolin, titanium dioxide, wollastonite and also nano-scale minerals (e.g. montmorillonites or nano-boehmite) etc., and these may also have been surface-treated. Preferred reinforcing materials are commercially available glass fibres. The glass fibres, whose fibre diameter is generally 8 to 18 µm, can be added in the form of continuous-filament fibres or in the form of cut or ground glass fibres, and the fibres here may, if appropriate, have been treated with surface modifications, e.g. silanes or glass-fibre sizes. Acicular mineral fillers are also suitable. For the purposes of the invention, acicular mineral fillers are mineral fillers with pronounced acicular character. An example that may be mentioned is acicular wollastonite. The L/D (length to diameter) ratio of the mineral is preferably from 2:1 to 35:1, with preference from 3:1 to 19:1 and most preferably from 4:1 to 12:1. The average particle size of the inventive acicular minerals is preferably smaller than 20 µm, particularly preferably smaller than 15 µm, with particular preference smaller than 10 µm, and most preferably smaller than 5 µm, determined using a CILAS GRANULOMETER. The mineral filler can, if appropriate, have been surface-treated. The amounts used of the fillers and reinforcing agents to be used, if appropriate, as component F) are from 0.1 to 60% by weight, preferably from 1 to 50% by weight, particularly preferably from 10 to 40% by weight, based in each case on the entire moulding composition. Most preference is given to commercially available glass fibres whose fibre diameter is 8 to 18 µm, and these can have been provided with surface modifications, e.g. silanes or glass-fibre sizes, or else with acicular mineral fillers, in particular wollastonite, which likewise may have been equipped with a surface modification.

In another preferred embodiment, the compositions can, if appropriate, comprise, either in addition to components E) and F) or instead of components E) and/or F), other additives. Examples of conventional additives of component G) are stabilisers (e.g. UV stabilisers, heat stabilisers, gamma-radiation stabilisers, hydrolysis stabilisers), antistatic agents, other flame retardants, emulsifiers, nucleating agents, plasticisers, processing aids, impact modifiers, dyes and pigments. The additives mentioned and other suitable additives are described by way of example in Gächter, Müller, Kunststoff-Additive [Plastics Additives], 3rd edition, Hanser-Verlag, Munich, Vienna, 1989 and in Plastics Additives Handbook, 5th edition, Hanser-Verlag, Munich, 2001. The additives can be used alone or in a mixture or in the form of masterbatches.

Examples of stabilisers that can be used are sterically hindered phenols and/or phosphites, hydroquinones, aromatic secondary amines, such as diphenylamines, substituted resorcinols, salicylates, benzotriazoles and benzophenones, and also variously substituted representatives of these groups and their mixtures.

UV stabilisers that may be mentioned are various substituted resorcinols, salicylates, benzotriazoles and benzophenones.

In the case of impact modifiers (elastomer modifiers, modifiers) the materials are very generally copolymers which are preferably composed of at least two of the following monomers: ethylene, propylene, butadiene, isobutene, isoprene, chloroprene, vinyl acetate, styrene, acrylonitrile and acrylates and, respectively, methacrylates having 1 to 18 carbon atoms in the alcohol component.

Colourants that can be added are inorganic pigments, such as titanium dioxide, ultramarine blue, iron oxide, zinc sulphide and carbon black, and also organic pigments, such as phthalocyanines, quinacridones, perylenes and also dyes, such as nigrosin and anthraquinones and also other colourants. For the purposes of the present invention, it is preferable to use carbon black.

Examples of nucleating agents that can be used are sodium phenylphosphinate or calcium phenylphosphinate, aluminium oxide or silicon dioxide and also preferably talc.

Examples of processing aids that can be used are copolymers composed of at least one α-olefin with at least one methacrylate or acrylate of an aliphatic alcohol. Preference is given here to copolymers in which the α-olefin is composed of ethene and/or propene and the methacrylate or acrylate contains, as alcohol component, linear or branched alkyl groups having 6 to 20 carbon atoms. 2-Ethylhexyl acrylate is particularly preferred.

Examples that may be mentioned of plasticisers are dioctyl phthalate, dibenzyl phthalate, butyl benzyl phthalate, hydrocarbon oils, N-(n-butyl)benzenesulphonamide.

Examples that may be mentioned of other flame retardants are phosphorus-containing flame retardants selected from the groups of the mono- and oligomeric phosphoric and phosphonic esters, phosphonate amines, phosphonates, phosphinates, phosphites, hypophosphites, phosphine oxides and phosphazenes, and it is also possible here to use, as flame retardant, a mixture of a number of components selected from one or from a variety of these groups. It is also possible to use other preferably halogen-free phosphorus compounds not specifically mentioned here, alone or in any desired combination with other, preferably halogen-free phosphorus compounds. Among these are also purely inorganic phosphorus compounds, such as boron phosphate hydrate. It is also possible to use salts of aliphatic and of aromatic sulphonic acids, and to use mineral flame retardant additives, such as aluminium hydroxide and/or magnesium hydroxide, Ca—Mg carbonate hydrates (e.g. DE-A 4 236 122 (=CA 2 109 024 A1) molybdenum oxide, zinc oxide, magnesium oxide or else zinc salts and magnesium salts. Other suitable flame retardant additives are carbonisers, such as phenol-formaldehyde resins, polycarbonates, polyphenyl ethers, polyimides, polysulphones, polyether sulphones, polyphenyl sulphides and polyether ketones and also antidrip agents, such as tetrafluoroethylene polymers.

In one preferred embodiment, the amounts that can be added of the additives of component G) to the inventive compositions are from 0.01 to 40% by weight, preferably from 0.01 to 20% by weight, particularly preferably from 0.1 to 15% by weight, based in each case on the entire moulding composition.

The present invention moreover also provides the fibres, foils and mouldings obtainable from the thermoplastic moulding compositions comprising A) from 20 to 97% by weight of an unbranched thermoplastic polyamide, B) from 1 to 30% by weight, preferably from 1 to 20% by weight, particularly preferably from 5 to 15% by weight, based on the entire composition, of one or more phosphinic salts of the formula (I) and/or of one or more diphosphinic salts of the formula (II) and/or polymers of these,

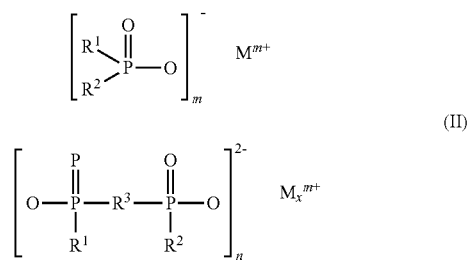

in which
R$^1$ and R$^2$ are identical or different and are hydrogen and/or linear or branched C$_1$-C$_6$-alkyl and/or are aryl,
R$^3$ is linear or branched C$_1$-C$_{10}$-alkylene or C$_6$-C$_{10}$-arylene or is C$_1$-C$_6$-alkylarylene or aryl-C$_1$-C$_6$-alkylene,
M is alkaline earth metals, alkali metals, aluminium, zinc, titanium, zirconium, silicon, tin and/or a protonated nitrogen base,
m is from 1 to 4,
n is from 1 to 3,
x is 1 and 2, C) from 1 to 40% by weight of a nitrogen-containing flame retardant combination composed of
C1) from 0.1 to 25% by weight, preferably from 0.2 to 10%, particularly preferably from 0.5 to 5%, based on 100% by weight of the entire composition, of melamine cyanurate and
C2) at least 0.1 to 25% by weight, preferably from 1 to 15% by weight, particularly preferably from 2 to 10% by weight, based on 100% by weight of the entire composition, of at least one other nitrogen-containing flame retardant which is not melamine cyanurate, preferably reaction products of melamine with phosphoric acid or with condensed phosphoric acids or, respectively, reaction products of condensates of melamine with phosphoric acid or with condensed phosphoric acids, particularly preferably melamine phosphate, melam polyphosphate, melon polyphosphate and melem polyphosphate, very particularly preferably melamine polyphosphate, and D) 0.1 to 10% by weight, preferably from 0.5 to 5% by weight, particularly preferably from 0.75 to 3.5% by weight, of at least one oxygen-, nitrogen- or sulphur-containing metal compound, preferably of the second main or transition group, particularly preferably Ca, Mg and Zn, very particularly preferably zinc borate and zinc sulphide.

In one preferred embodiment, the present invention also provides fibres, foils and mouldings which comprise, if appropriate, in addition to components A) to D), one or more of components E) and/or F) and/or G).

Finally, the present invention also provides a process for production of fibres, of foils and of mouldings, characterized in that moulding compositions are used which comprise components A to D) and also, in preferred embodiments, if appropriate, E), F) and/or G).

EXAMPLES

In order to demonstrate the improvements described according to the invention in flame retardancy and mechanical properties, compounding was first used to prepare appropriate plastics moulding compositions. To this end, the individual components were mixed in a twin-screw extruder (ZSK 32 Mega Compounder from Coperion Werner & Pfleiderer (Stuttgart, Germany)) at temperatures of 270 to 335° C., extruded, cooled until they could be pelletized, and pelletized. After drying (generally two days at 70° C. in a vacuum drying cabinet) the pellets were processed at temperatures of 270 to 300° C. to give standard test specimens for the UL94V test, to give test specimens for the EEC 60695-2-12 glow-wire test and also to give test specimens for the mechanical tests to ISO 180/1U (IZOD impact resistance) and ISO 178 (flexural test), these being used to determine the fire properties of the inventive moulding compositions and also their mechanical properties.

The flame retardancy of the moulding compositions was firstly determined by the UL94V method (Underwriters Laboratories Inc. Standard of Safety, "Test for Flammability of Plastic Materials for Parts in Devices and Appliances", p. 14 to p. 18 Northbrook 1998).

Glow-wire resistance was determined using the IEC 60695-2-12 GWFI (glow-wire flammability index) glow-wire test and also using the 60695-2-13 GWIT test (glow-wire ignition temperature) glow-wire ignition test. In the GWFI test, a glowing wire is used at temperatures of 550 to 960° C. to determine, on 3 test specimens (e.g. 60×60×1,5 mm sheets), the maximum temperature at which an afterflame time of 30 seconds is not exceeded and no flaming drops come from the specimen. In the GWIT test, with a comparable test procedure, the glow-wire ignition temperature is stated, being higher by 25K (30K at 900° C. to 960° C.) than the maximum glow-wire temperature which in 3 successive tests does not cause ignition even during the time of exposure to the glow wire. Ignition here means a flame with flame time ≧5 sec. In the light of IEC 60335-1, which, using a test comparable with IEC 60695-2-13 on the finished part (e.g. on a plug connecter which has been installed and is ready to use), at a glow-wire temperature of 750° C., permits only ignition with flame of duration at most 2 sec, the relative examples also give the maximum flame time for glow-wire exposure at 750° C. for a period of 30 sec.

Mechanical properties are obtained from impact resistance measurements IZOD (ISO 180/1U, 23-C) or from flexural experiments to ISO 178.

The following materials were used in the experiments:

Component A: nylon-6 (Durethan® B29, Lanxess Deutschland GmbH (Lanxess Group), Leverkusen, Germany)

Component B: System of formula (I), where $R^1=R^2=$ethyl and M=aluminium [as in EP-A 803508/EP-A 944637]

Component C/1: melamine cyanurate (Melapur® MC25 from CIBA, Basle, Switzerland)

Component C/2: melamine polyphosphate (Melapur® 200/70 from CIBA, Basle, Switzerland)

Component D/1: zinc borate (Firebrake® ZB from Deutsche Borax GmbH, Sulzbach, Germany)

Component D/2: zinc sulphide (Sachtolith® HDS from Sachtleben, Duisburg, Germany)

Component E: N,N'-ethylenebisstearylamide

Component F: CS 7928 chopped glass fibre from Lanxess Deutschland GmbH

Component G: other additives where the total of proportions of the components is 100% by weight.

TABLE 1

| Component | E1 | E2 | E3 | CE1 | CE2 | CE3 |
|---|---|---|---|---|---|---|
| A | 49.4 | 51.4 | 48.4 | 51.4 | 48.4 | 45.4 |
| B | 10 | 10 | 10 | 10 | 10 | 10 |
| C/1 | 3 | 2 | 3 | 3 | 6 | 9 |
| C/2 | 5 | 5 | 5 | 5 | 5 | 5 |
| D/1 | 2 | 1 | 3 | 0 | 0 | 0 |
| E | 0.3 | 0.3 | 0.3 | 0.3 | 0.3 | 0.3 |
| F | 30 | 30 | 30 | 30 | 30 | 30 |
| G | 0.3 | 0.3 | 0.3 | 0.3 | 0.3 | 0.3 |
| UL 94 (0.8/1.6 mm) | V0/V0 | —/V0 | V0/V0 | —/V0 | —/V0 | —/V-0 |
| GWFI (0.75 mm) | 960° C. | — | 960° C. | — | — | — |
| GWFI (1.5 mm) | 960° C. | 960° C. | 960° C. | 960° C. | 960° C. | 850° C. |
| GWIT (0.75 mm) | 775° C. | — | 775° C. | — | — | — |
| GWIT (1.5 mm) | 800° C. | 775° C. | 800° C. | 700° C. | 725° C. | 700° C. |
| GWIT (3.0 mm) | >775° C. | — | >775° C. | — | — | — |
| IEC 60695-2-13: flame time at 750° C. (0.75 mm) in sec | 0 | — | 0 | — | — | — |
| IEC 60695-2-13: flame time at 750° C. (1.5 mm) in sec | 0 | 0 | 0 | >5 | >5 | >5 |
| IEC 60695-2-13: flame time at 750° C. (3.0 mm) in sec | 0 | — | 0 | — | — | — |
| IZOD impact resistance (ISO 180/1U 23° C.) | 55 kJ/m$^2$ | 56 kJ/m$^2$ | 50 kJ/m$^2$ | 34 kJ/m$^2$ | 32 kJ/m$^2$ | 25 kJ/m$^2$ |
| edge fibre strain at maximum force | 3.2% | 3.3% | 3.0% | 2.5% | 2.3% | 2.2% |
| Flexural strength [MPa] | 224 | 227 | 217 | 210 | 202 | 199 |

Components stated in % by weight, based on the entire moulding composition

TABLE 2

| Component | CE4 | CE5 | CE6 | CE7 | CE8 |
|---|---|---|---|---|---|
| A | 52.4 | 50.4 | 52.4 | 50.4 | 54.4 |
| B | 10 | 10 | 10 | 10 | 10 |
| C/1 | 0 | 0 | 0 | 0 | 0 |
| C/2 | 5 | 5 | 5 | 5 | 5 |
| D/1 | 2 | 4 | | | 0 |
| D/2 | | | 2 | 4 | |
| E | 0.3 | 0.3 | 0.3 | 0.3 | 0.3 |
| F | 30 | 30 | 30 | 30 | 30 |
| G | 0.3 | 0.3 | 0.3 | 0.3 | 0.3 |
| UL 94 (0.8/1.6 mm) | —/V-0 | —/V-1 | —/V-0 | —/V-0 | —/V-0 |
| GWFI (0.75 mm) | — | — | — | — | — |
| GWFI (1.5 mm) | 900° C. | 850° C. | 850° C. | 850° C. | 900° C. |
| GWIT (0.75 mm) | — | — | — | — | — |
| GWIT (1.5 mm) | 750° C. | — | 725° C. | — | 725° C. |
| GWIT (3.0 mm) | — | — | — | — | — |
| IEC 60695-2-13: flame time at 750° C. | | | | | |

TABLE 2-continued

| Component | CE4 | CE5 | CE6 | CE7 | CE8 |
|---|---|---|---|---|---|
| (0.75 mm) in sec | | | | | |
| IEC 60695-2-13: flame time at 750° C. (1.5 mm) in sec | >5 | — | >5 | — | >5 |
| IEC 60695-2-13: flame time at 750° C. (3.0 mm) in sec | — | — | — | — | — |
| IZOD impact resistance (ISO 180/1U 23° C.) | 41 kJ/m² | 32 kJ/m² | 54 kJ/m² | 53 kJ/m² | 60 kJ/m² |
| edge fibre strain at maximum force | 2.7% | 2.2% | 3.3% | 3.3% | 3.5% |
| flexural strength | 200 | 178 | 229 | 227 | 248 |

Components stated in % by weight, based on the entire moulding composition

TABLE 3

| Component | CE9 | CE10 | CE11 |
|---|---|---|---|
| A | 50.7 | 50.4 | 51.4 |
| B | 11.3 | 11.3 | 12 |
| C/1 | 2 | 0 | 0 |
| C/2 | 5.7 | 5.7 | 6 |
| D/1 | 0 | 2 | 0 |
| E | 0 | 0.3 | 0.3 |
| F | 30 | 30 | 30 |
| G | 0.3 | 0.3 | 0.3 |
| UL 94 (0.8/1.6 mm | V2/V0 | V0/V0 | V2/V0 |
| GWFI (0.75 mm) | — | — | — |
| GWFI (1.5 mm) | — | — | — |
| GWIT (0.75 mm) | 675° C. | 675° C. | 675° C. |
| GWIT (1.5 mm) | 675° C. | 700° C. | 675° C. |
| GWIT (3.0 mm) | — | — | — |
| IEC 60695-2-13: flame time at 750° C. (0.75 mm) in sec | >5 | >5 | >5 |
| IEC 60695-2-13: flame time at 750° C. (1.5 mm) in sec | >5 | >5 | >5 |
| IEC 60695-2-13: flame time at 750° C. (3.0 mm) in sec | — | — | — |
| IZOD impact resistance (ISO 180/1 U 23° C.) | 54 kJ/m² | 49 kJ/m² | 51 kJ/m² |
| edge fibre strain at maximum force | 3.3% | 3.1% | 3.3% |
| flexural strength [MPa] | 234 | 215 | 229 |

Tables 1 to 3 show that the inventive specific halogen-free combination of components B), C/1), C/2) and D/1) (Inventive Example IE1, IE2 and IE3) represents a dramatic improvement over the prior art both with respect to flame retardancy (Ul94 V-0, GWFI 960° C. and GWIT 775° C.) and also with respect to mechanical properties (impact resistance and flexural strength). The comparative examples moreover show that omission of component D1 cannot be compensated by feeding a larger amount of C1 (CE 1, 2 and 3) without facing resultant disadvantages in GWIT performance and mechanical properties. The same also applies for omission of C1 and use of a larger amount of D1 (CE 4 and 5). If both component C1) and D1) are omitted, although mechanical properties are retained at a high level, glow-wire ignition remains well below the requirements (CE 8). The characteristics described remain unaltered even if the proportion of the phosphinate component B and of the second nitrogen-containing component C2) is increased (CE 9-12).

The present invention has been described with reference to specific details of particular embodiments and examples thereof. It is not intended that such details be regarded as limitations upon the scope of the invention except insofar as and to the extent that they are included in the accompanying claims.

To the extent United Kingdom spelling is set forth herein the same shall be understood to be equivalent to United States English spelling, e.g., moulding and fibres shall be equivalent to molding and fibers, respectively.

What is claimed is:

1. A molding composition comprising:
   A) from 20 to 97% by weight of an unbranched aliphatic thermoplastic polyamide,
   B) from 1 to 30% by weight, based on the entire composition, of at least one phosphinic acid salt of the formula (I)

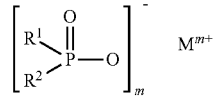

(I)

wherein
   $R^1$ and $R^2$ are ethyl,
   M is aluminum,
   M is from 1 to 4,
   C) from 1 to 40% by weight of a nitrogen-containing flame retardant combination of
      C1) from 2 to 3% by weight, based on 100% by weight of the entire composition, of melamine cyanurate and
      C2) about 5% by weight, based on 100% by weight of the entire composition, of melamine polyphosphate,
   D) from 1 to 3% by weight, based on the entire composition, of zinc borate.

2. A molding composition comprising:
   A) from 20 to 97% by weight of an unbranched aliphatic thermoplastic polyamide,
   B) from 1 to 30% by weight, based on the entire composition, of at least one phosphinic acid salt of the formula (I)

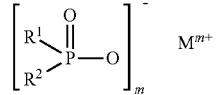

(I)

wherein
   $R^1$ and $R^2$ are ethyl,
   M is aluminum,
   M is from 1 to 4,

C) from 1 to 40% by weight of a nitrogen-containing flame retardant combination of
  C1) from 0.1 to 25% by weight, based on 100% by weight of the entire composition, of melamine cyanurate and
  C2) at least 0.1 to 25% by weight, based on 100% by weight of the entire composition, of melamine polyphosphate,
  wherein the ratio of the melamine cyanurate C1) to the melamine polyphosphate C2) is from 2:5 to 3:5, and
D) from 0.1 to 10% by weight, based on the entire composition, of zinc borate.

3. The molding composition according to either claim 1 or claim 2, further comprising:
  F) from 0.1 to 60% by weight of one or more fillers and reinforcing materials.

4. The molding composition according to either claim 1 or claim 2, further comprising:
  G) 0.01 to 40% by weight, based on the entire composition, of other additives.

5. A process for producing fibers, foils or moldings, comprising:
  forming said fibers, foils or moldings from the molding composition according to either claim 1 or claim 2.

6. Fibers, foils and moldings obtainable via the process according to either claim 1 or claim 2.

7. A process for production of halogen-free flame-retardant foils, fibers or moldings, comprising:
  forming said halogen-free flame-retardant fibers, foils or moldings from the molding composition according to either claim 1 or claim 2.

* * * * *